318-135 SR

5/4/82 XR 4,328,507

United States Patent [19]

Kyogoku

[11] 4,328,507

[45] May 4, 1982

[54] RECORDING APPARATUS

[75] Inventor: Hiroshi Kyogoku, Kawasaki, Japan

[73] Assignee: Canon Kabushiki Kaisha, Tokyo, Japan

[21] Appl. No.: 151,702

[22] Filed: May 20, 1980

[30] Foreign Application Priority Data

May 31, 1979 [JP] Japan ................................ 54/67742

[51] Int. Cl.$^{3}$ ........................................ G01D 15/24

[52] U.S. Cl. ............................ 346/139 R; 318/135; 346/140 R; 400/126; 400/322

[58] Field of Search .................... 346/75, 139 R, 140; 318/135; 400/126, 322

[56] References Cited

U.S. PATENT DOCUMENTS

| | | | |
|---|---|---|---|
| 4,012,676 | 3/1977 | Giebler | 318/135 |
| 4,044,881 | 8/1977 | Chai | 318/135 X |
| 4,144,537 | 3/1979 | Kimura | 346/140 R |

*Primary Examiner*—Joseph W. Hartary

*Attorney, Agent, or Firm*—Fitzpatrick, Cella, Harper & Scinto

[57] ABSTRACT

Recording apparatus utilizing a linear motor, provided with a member for maintaining the printing head in a particular position while the printing head is not in use.

3 Claims, 3 Drawing Figures

RECORDING APPARATUS

BACKGROUND OF THE INVENTION

1. Field of the Invention

The present invention relates to positioning of the printing head in recording apparatus utilizing a linear motor.

2. Description of the Prior Art

The use of a linear motor as a drive source for driving a printing head carriage allows to directly obtain a linear driving and to change the direction of displacement by changing over in direction the electric current supplied to the winding of the motor, thus enabling high-speed directional change with simple electric means, significant reduction in the number of components involved and simplification in the mechanism. Also an ink jet head, if employed as the printing means, need not be stopped at each printing position but is preferably displaced continuously at a constant speed for obtaining a satisfactory print quality, and the use of the linear motor in combination is therefore advantageous.

In case the moving coil of such linear motor used in the head carriage is not fed with electric current, the carriage takes a relatively free state and is therefore easily displaceable even by slight vibration or external force. This fact tends to cause its printing start position to be fluctuated, and may therefore result in fluctuation in a time period required for reaching the printing position or possibility that the required displacing speed is not reached.

SUMMARY OF THE INVENTION

An object of the present invention is to provide a simple method of maintaining the carriage at a particular position.

DESCRIPTION OF THE PREFERRED EMBODIMENT

Figure 1:
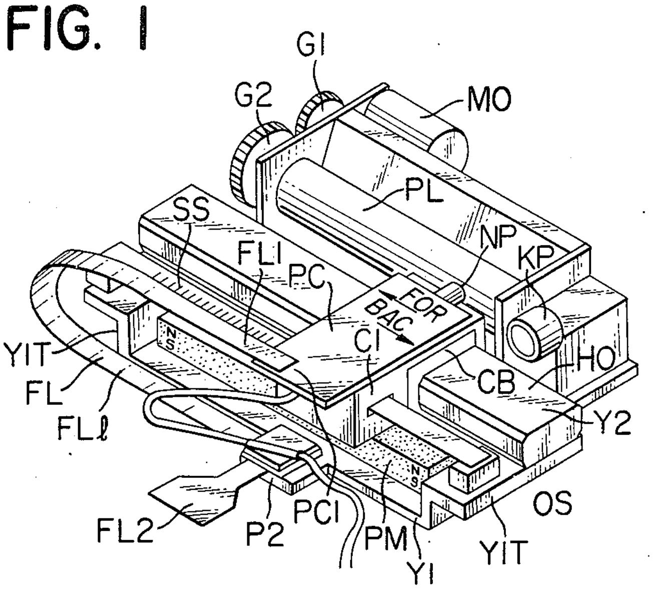
FIG. 1 is a perspective view showing an embodiment of the printing apparatus in accordance with the present invention.

FIG. 1 shows an embodiment of the recording apparatus of the present invention, wherein the linear motor is provided with a closed magnetic circuit composed of a permanent magnet PM, a magnetic plate Y1 and a magnetic guide member Y2. A coil winding C wound on a coil bobbin CB slidably mounted on the magnetic guide member Y2 is displaced under the Fleming's left hand law upon receipt of an electric current to drive a carriage CA structured integral with coil bobbin CB. The reciprocating motion of the carriage along the guide member Y2 is achieved by changing over the direction of the electric current supplied to the coil C. A graduation plate, such as a non-magnetic optical slit plate OS, is fixed at both ends thereof to the folded ends Y1T of the guide member Y2 so as to be parallel thereto. These ends act as carriage stops. The carriage CA is provided with the coil bobbin CB, a printing head such as an ink jet nozzle NP and slit detecting means (not shown) such as a light-emitting diode and a phototransistor. The drive terminals of the coil C and ink jet nozzle NP, and the electrodes of the light-emitting diode and phototransistor are connected to a flexible cable FL of which the other end is connected to a connector (not shown), whereby the displacement of the carriage and the operation of the ink jet nozzle are controlled through the signal lines FL1 of flexible cable FL.

The optical slit plate OS is positioned between the light-emitting diode and the phototransistor, and the phototransistor intermittently receives the infrared light from the light-emitting diode through the slits SS of the optical slit plate to detect the speed and position of the carriage CA in the scanning motion; thereby controlling the speed of scanning and the operations of the ink jet nozzle and the paper feeding stepping motor.

Printed characters are in the form of a dot matrix.

In response to a print instruction signal, the carriage CA initiates the displacement, and the carriage position is detected by the timing signals from the optical slit plate OS. In this manner drive signals are supplied to the ink jet nozzle at its determined positions to shoot ink droplets therefrom, thereby performing printing on recording paper (not shown).

Upon completion of the printing operation the carriage CA is returned to the initial position (home position HO) in response to drive pulses of an inverted polarity, while the paper feeding is achieved by the stepping motor MO of which rotation is transmitted with reduction through a motor shaft gear (not shown), and gears G1 and G2.

The final gear G2 is fixed on the shaft of the platen PL for feeding the paper by a determined amount in the vertical direction. Upon termination of the printing operation the nozzle NP is displaced to its home position HO having a cap KP, which functions to prevent clogging or drying of the ink jet nozzle and meniscus retraction in the nozzle.

The embodiment explained in the foregoing is extremely quiet because of the absence of a rotary motor or its associated mechanisms such as gears, links, racks, belts, etc., for the carriage drive and because of the absence of ratchets and plungers for feeding paper.

Figure 2:
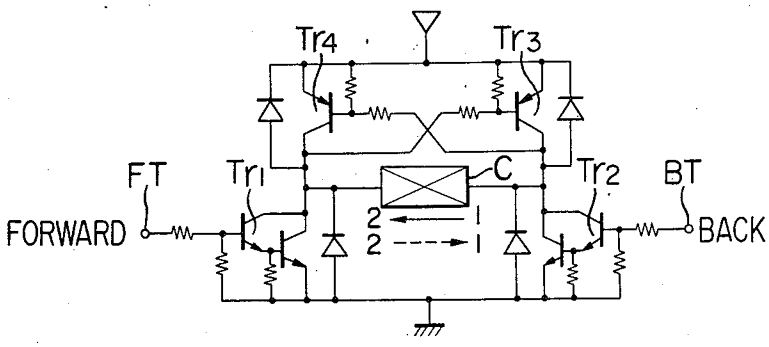
FIG. 2 is a circuit diagram showing a part of the drive circuit for the apparatus shown in FIG. 1.

FIG. 2 shows a current supply switching circuit for the coil on the carriage. When a high-level signal is supplied to the terminal FORWARD, Darlington-connected transistors Tr1 and a transistor Tr3 are turned on to supply electric current to a linear motor coil C in the direction of the solid line arrow thereby causing leftward displacement of the carriage. On the other hand when a high-level signal is supplied to the terminal BACK, Darlington-connected transistors Tr2 and a transistor Tr4 are turned on to supply electric current to the motor coil C in the direction of the dotted line arrow thereby causing rightward displacement of the carriage.

Figure 3:
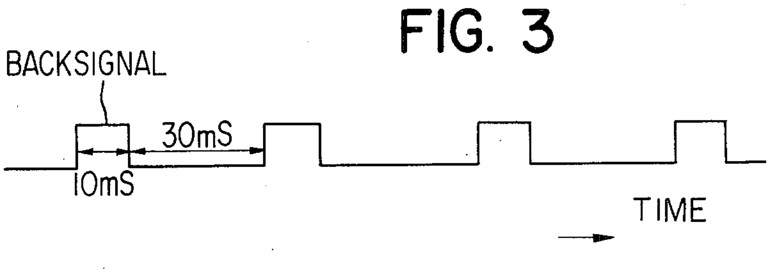
FIG. 3 shows a waveform of the drive signal for the circuit shown in FIG. 2.

In accordance with the present invention, after the arrival of the carriage CA at its right-end position in the vicinity of a cap KP, a back signal of a waveform as shown in FIG. 3 is supplied to BACK terminal shown in FIG. 2 to continuously energize the coil C of the carriage CA thereby biasing the carriage toward the right. In this manner it is rendered possible to maintain the carriage in a fixed position against possible vibration or external force.

The signal shown in FIG. 3 has a duty ratio of 25%, but it is naturally possible to arbitrarily select another duty ratio, for example 50% or 10%.

As explained in the foregoing, the carriage can be maintained at a right-end determined position, without particular supporting means such as an exclusive solenoid, by biasing the carriage in the backward direction with a suitable pulse current or a constant current while the carriage is not in its printing operation. In this manner the present invention is featured by the fact that the driving means for the carriage is utilized also as the carriage supporting or maintaining means.

What I claim is:

1. A recording apparatus comprising:

a linear motor including a fixed permanent magnet and a movable coil;

a carriage supporting said movable coil and an ink jet nozzle thereon;

a driving circuit for selectively supplying drive signals to said movable coil to cause said carriage to move in forward and reverse directions;

stopper means provided at one end of said linear motor means to cause a reverse displacement of said carriage to be mechanically stopped;

protection means provided in the vicinity of said stopper means to protect said ink jet nozzle; and means for maintaining said carriage at said one end of said linear motor means at said stopper means upon the application of a back signal from said drive circuit to said moving coil.

2. A recording apparatus according to claim 1, wherein said back signal comprises a timing signal.

3. A recording apparatus according to claim 1, wherein said ink jet nozzle and said protection means are disposed in facing relationship with each other by said maintaining means when said carriage is maintained at said one end of said linear motor.

* * * * *